(12) United States Patent
Feria et al.

(10) Patent No.: US 7,720,472 B1
(45) Date of Patent: *May 18, 2010

(54) STRATOSPHERIC-BASED COMMUNICATION SYSTEM HAVING INTERFERENCE CANCELLATION

(75) Inventors: Ying Feria, Manhattan Beach, CA (US); Ming Chang, Rancho Palos Veredes, CA (US); Donald C. D. Chang, Thousand Oaks, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 622 days.

This patent is subject to a terminal disclaimer.

(21) Appl. No.: 09/661,967

(22) Filed: Sep. 14, 2000

(51) Int. Cl.
*H04W 4/00* (2009.01)
(52) U.S. Cl. ............... 455/427; 455/13.1; 455/132; 455/430; 455/651; 342/381
(58) Field of Classification Search ......... 455/12.1, 455/13.1, 13.3, 63, 132, 134, 278.1, 422, 455/427, 430, 561, 3.02, 552, 69, 456.5, 455/525, 63.1, 114.2, 296, 114.1, 576.6, 455/576.7; 342/381
See application file for complete search history.

(56) References Cited

U.S. PATENT DOCUMENTS

| | | | | |
|---|---|---|---|---|
| 4,577,330 A | * | 3/1986 | Kavehrad | 375/235 |
| 4,635,063 A | | 1/1987 | Chang et al. | |
| 5,218,619 A | | 6/1993 | Dent | 375/1 |
| 5,343,208 A | * | 8/1994 | Chesley | 342/196 |
| 5,345,448 A | | 9/1994 | Keskitalo | |
| 5,361,074 A | | 11/1994 | Hansen | |
| 5,410,731 A | * | 4/1995 | Rouffet et al. | 455/13.1 |
| 5,550,809 A | | 8/1996 | Bottomley et al. | 370/18 |
| 5,555,257 A | | 9/1996 | Dent | 370/95.1 |
| 5,572,216 A | | 11/1996 | Weinberg et al. | 342/357 |
| 5,594,941 A | | 1/1997 | Dent | 455/13.4 |
| 5,666,128 A | | 9/1997 | Murray et al. | |
| 5,765,098 A | * | 6/1998 | Bella | 455/13.3 |
| 5,810,284 A | | 9/1998 | Hibbs et al. | 244/13 |
| 5,856,804 A | | 1/1999 | Turcotte et al. | 342/371 |
| 5,903,549 A | * | 5/1999 | von der Embse et al. | 370/310 |
| 5,909,460 A | | 6/1999 | Dent | 375/200 |

(Continued)

FOREIGN PATENT DOCUMENTS

EP 0 776 099 A2 5/1997

(Continued)

OTHER PUBLICATIONS

K. K. Chan, F. Marcoux, M. Forest, L. Martins-Camelo, "A Circularly Polarized Waveguide Array for LEO Satellite Communications", pp. 154-157, IEEE1999 AP-S International Symposium, Jun. 1999.

(Continued)

*Primary Examiner*—Nghi H Ly

(57) ABSTRACT

A system has a stratospheric platform with a payload controller and a phased array antenna having a plurality of elements. A gateway station communicates with the stratospheric platform. The gateway station scales the plurality of elements to form a reconfigurable plurality of beams. The gateway station communicates a control signal to the stratospheric platform to communicate a scaling of the elements. The stratospheric platform configures the elements of the phased array antenna according to the scaling using adaptive interference rejections.

15 Claims, 3 Drawing Sheets

U.S. PATENT DOCUMENTS

| | | | |
|---|---|---|---|
| 5,917,447 | A | 6/1999 | Wang et al. |
| 5,946,625 | A | 8/1999 | Hassan et al. |
| 5,949,766 | A | 9/1999 | Ibanez-Meier et al. ...... 370/316 |
| 5,966,371 | A * | 10/1999 | Sherman ..................... 370/320 |
| 6,084,541 | A | 7/2000 | Sayegh |
| 6,088,341 | A | 7/2000 | Hinedi et al. |
| 6,151,308 | A * | 11/2000 | Ibanez-Meier et al. ...... 370/316 |
| 6,157,685 | A * | 12/2000 | Tanaka et al. ............... 375/346 |
| 6,188,896 | B1 | 2/2001 | Perahia et al. |
| 6,289,004 | B1 * | 9/2001 | Mesecher et al. ........... 370/286 |
| 6,380,893 | B1 | 4/2002 | Chang et al. |
| 6,393,303 | B1 | 5/2002 | Katz |
| 6,463,294 | B1 * | 10/2002 | Holma et al. ............... 455/513 |
| 6,519,477 | B1 * | 2/2003 | Baier et al. .............. 455/67.11 |
| 6,556,809 | B1 | 4/2003 | Gross et al. |
| 6,639,551 | B2 * | 10/2003 | Li et al. ..................... 342/381 |
| 6,819,943 | B2 * | 11/2004 | Dalal ...................... 455/562.1 |
| 6,895,217 | B1 * | 5/2005 | Chang et al. ............... 455/13.2 |
| 7,369,847 | B1 | 5/2008 | Rosen et al. |
| 2001/0055320 | A1 | 12/2001 | Pierzga et al. |

FOREIGN PATENT DOCUMENTS

| | | |
|---|---|---|
| EP | 0 860 952 A2 | 8/1998 |
| EP | 0883266 | 12/1998 |
| EP | 0 961 416 A1 | 12/1999 |
| GB | 2 349 045 A | 10/2000 |

OTHER PUBLICATIONS

M. Oodo, R. Miura, Y. Hase, "Onboard DBF Antenna for Stratospheric Platform", pp. 125-128, IEEE Conference on Phased Array Systems and Technology, California, May 21-25, 2000.
Yokosuka Research Park, "The First Stratospheric Platform Systems Workshop", pp. 1-216, May 12-13, 1999.
U.S. Appl. No. 09/655,041, filed Sep. 5, 2000, Chang et al.
U.S. Appl. No. 09/611,753, filed Jul. 7, 2000, Chang et al.
U.S. Appl. No. 09/661,725, filed Sep. 14, 2000, Chang et al.
U.S. Appl. No. 09/644,224, filed Aug. 21, 2000, Chang et al.
Chiba et al., "Digital Beam Forming (DBF) Antenna System for Mobile Communications", IEEE AES Systems Magazine, Sep. 1997, pp. 31-41.
U.S. Appl. No. 09/661,986, filed Sep. 14, 2000, Rosen et al.
Final Rejection dated Mar. 13, 2009 in U.S. Appl. No. 09/858,387, filed May 15, 2001 by Donald C.D. Chang et al.
Non-final Office action dated Oct. 28, 2009 in U.S. Appl. No. 09/858,387, filed May 15, 2001 by Donald C. D. Chang et al.
Non-final Office action dated Jan. 27, 2010 in U.S. Appl. No. 12/046,271 filed Mar. 11, 2008 by Harold A. Rosen et al.

* cited by examiner

STRATOSPHERIC-BASED COMMUNICATION SYSTEM HAVING INTERFERENCE CANCELLATION

TECHNICAL FIELD

The present invention relates generally to a mobile communication system and more particularly, to a mobile communication system using a stratospheric platform and a gateway station that forms the multiple beams on the ground using cross-canceling interference rejection.

BACKGROUND ART

In this communication age, content providers are increasingly investigating ways in which to provide more content to users as well as interfacing with users.

Communication satellites have become commonplace for use in many types of communication services, e.g., data transfer, voice communications, television spot beam coverage, and other data transfer applications. As such, "bent pipe" satellites transmit and receive large amounts of signals used or "multiple spot beam" configuration to transmit signals to desired geographic locations on the earth. Mobile applications such as telephones and personal digital applications are becoming increasingly popular.

All of these current mobile satellite communication systems, however, suffer from a variety of disadvantages. First, they all have limited frequency resources. Any given frequency over a given ground position can only be utilized by one user with mobile handset at a time. This is true regardless of the sophistication of the system, including systems that utilize multiple beam satellite designs. Even when multiple satellites are available at a given geographic location, the same frequency spectrum cannot be used by more than one nearby mobile handset user. The availability of multiple satellites merely serves to increase the availability of the system to that mobile handset user who is assigned the specific frequency spectrum. However, the total capacity of these mobile communication satellite systems is still limited by the inefficient usage of the frequency spectrum. Thus, the potential growth of these current satellite communication systems is inherently limited.

Additionally, current telecommunications systems only allow mobile-to-hub and hub-to-mobile communications in most of the low earth orbit and medium earth orbit mobile satellite constellations. Mobile-to-mobile linkages require multiple hops between hubs. Thus, one user with a mobile handset utilizes a satellite at a frequency slot to communicate to his counterpart on the network. Other satellites on or in the same region cannot reuse the same frequency slot for other nearby handset users. Thus, if a secondary user nearby has a handset that requires a particular frequency, which is being utilized by the first user nearby, the second user is unable to access the system through the same frequency via different satellites.

As described in U.S. Pat. No. 5,903,549, satellites may use a phased array antenna to communicate with users on the ground. The phased array antenna is comprised of a plurality of elements that are used to form a beam. The beam forming is implemented by adjusting the amplitude and phase of each signal path routed to each feed element. Each individual signal path is routed to multiple feeds with relative amplitudes and phases, which define each intended beam. In the '549 patent, the beam forming has been removed from the satellite and is performed on the ground. This reduces the complexity of the payload of the satellite.

Implementing a mobile communication system using a satellite is relatively expensive due to the typical complexity of the satellite payload and the expense of launch. The satellites also use a relatively low gain antenna, which is sometimes inadequate for third generation (3-G) cellular type systems. Because of the complexity, the satellites cannot be deployed quickly and thus, from a business standpoint, market share may be lost. Also, as new technology develops, the satellite must be replaced which is also very expensive.

Limitations to the number of users may be inhibited by interference in systems. That is, for every beam having a main lobe, a parasitic number of side lobes exist which may cause interference with beams using the same system resource such as frequency.

It would therefore be desirable to provide a mobile communication system that is capable of rapid deployment, is easy to change, should the technology inevitably change and reduces the amount of interference with adjacent beams to permit high throughput.

SUMMARY OF THE INVENTION

It is therefore an object of the invention to provide a mobile communication system that allows rapid deployment and provides interference rejection. It is a further object of the invention to provide a stratospheric platform based mobile communication system.

In one aspect of the invention, a communication system has a stratospheric platform having a payload controller and a phased array antenna having a plurality of elements for generating a first beam and a second beam. A gateway station in communication with the stratospheric platform receives a first signal having a first beam having interference from the second beam therein and receives a second signal having the second beam having interference from the first beam therein.

The gateway station comprises a first subtracting block for subtracting the second signal from the first signal to obtain the first beam.

The gateway station has a second subtracting block for subtracting the first signal from the second signal to obtain a second beam.

In a further aspect of the invention, a method of controlling a communication system having a stratospheric platform with a phased array antenna, having a plurality of elements, comprises the steps of:

receiving a first signal having a first beam having interference from the second beam therein at a gateway station;

receiving a second signal having a second beam having interference from the first beam therein at the gateway station, subtracting said second signal from said first signal to obtain a the first beam; and subtracting said first signal from said second signal to obtain a second beam.

One advantage of the invention is that due to the interference detection and reduction, system throughput is increased over conventional systems.

Another advantage of the invention is that the payload weight and power consumption are significantly reduced without impacting system performance. The whole beam forming and traffic switching or routing mechanisms, normally on board the platform, have been moved to ground, taking advantage of the unique "spoke and hub" communications traffic topology.

Other features and advantages of the present invention using digital beam forming on ground are readily apparent from the following detailed description of the best mode for carrying out the invention when taken in connection with the accompanying drawings.

BEST MODES FOR CARRYING OUT THE INVENTION

Figure 1:
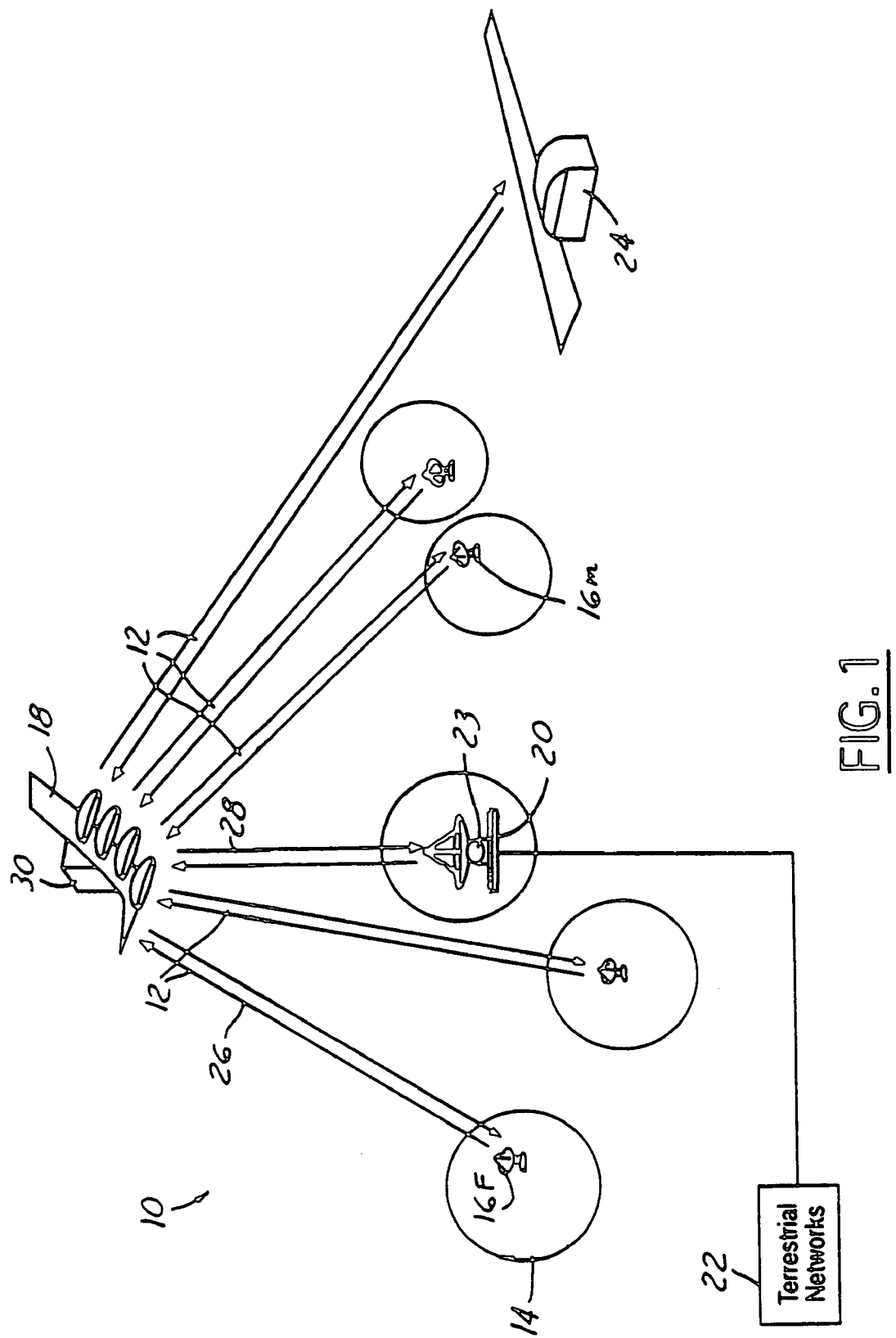
FIG. 1 is a system diagram of a communication system according to the present invention.

In the following description, the same reference numerals are used to identify the same components in the various views. Those skilled in the art will recognize that various other embodiments, structural changes and changes in measures may be made without departing from the scope of the invention.

Referring now to FIG. 1, a communications system 10 has a plurality of beams 12 that are illustrated as a plurality of circles 14 on the earth's surface. Circles 14 represent the footprint of a radiated beam onto the earth's surface. As will be described below the beams preferably move with the users. A plurality of user terminals 16M and 16F are used to illustrate mobile users and fixed users, respectively. Mobile users 16M may comprise but are not limited to automotive applications, personal digital assistant applications and cellular phone applications. Fixed user terminals 16F may, for example, comprise business-based or consumer-based communication systems. Each user terminal 16F and 16M may receive a signal with the predetermined signal strength from a spot beam pattern that is radiated from stratospheric platform 18. The present invention is particularly advantageous for use with mobile terminals 16M.

Communication system 10 further includes a gateway station 20 that is coupled to terrestrial networks 22. Communication system may also include a platform operations center 24. Both gateway station 20 and platform operations center 24 are in communication with stratospheric platform 18. Gateway station 20 provides a link between user terminals 16F, 16M and terrestrial networks 22 through stratospheric platforms 18. Platform operation center 24 provides command and control functions to communications platform 18. Although illustrated as two separate units, gateway station 20 and platform operation center 24 may be combined into the same physical location.

The communication signals between stratospheric platform 18 and user terminals 16M and 16F may be referred to as user links 26. User links 26 represent the transmit and receive beams from both categories of user terminals 16F, 16M and high altitude communications platform 18. A feeder link 28 is defined between high altitude communications platform 18 and gateway station 20.

High altitude communications platform 18 is preferably a stratosphere-based platform such as those under development by AeroVironment. Helios is one such project being developed by AeroVironment and is an unmanned vehicle that can fly for several months at an altitude of over 60,000 feet above the earth. Helios is a solar-powered, electric plane that is modular in design and may be configured in a variety of ways. The stratospheric platform is operated through the platform operations center 24 to fly in a small radius flight path over a given spot on the earth. As far as users are concerned, the platform is geo-stationary. In addition to a plane-like platform, the stratospheric platform may comprise a balloon or blimp-like platforms.

Stratospheric platform 18 is used as a communication node for gateway station 20 and user terminals 16F and 16M, each of which have an antennas that are pointed in the direction of the high altitude communications platform 18. As will be described below, the pointing from mobile terminals 16M may be performed electronically. Although only one gateway station 20 is illustrated in the figure, those skilled in the art would recognize that various numbers of gateway stations may be employed. As would be further described below, gateway is station 20 with a high gain antenna that has a narrow beam width. The antenna may need a tracking mechanism with tracking speed adequate enough to maintain a communication link with the platform 18 throughout the flight path. Gateway station 20 may be coupled to terrestrial networks 22 such as the public service telephone network, the Internet, or an intranet. Gateway station 20 has communications processing facility 23 that controls the communication with the high altitude communications platform 18.

High altitude communication platform 18 has a payload 30 that links with user terminal 16M, 16F through the use of a phased array antenna and gateway station 20 with a feeder link antenna (preferably a parabolic dish) described below. In the present example, the payload 30 is used to generate a plurality of user beams configured according to the signals as determined in the gateway station 20.

Figure 2:
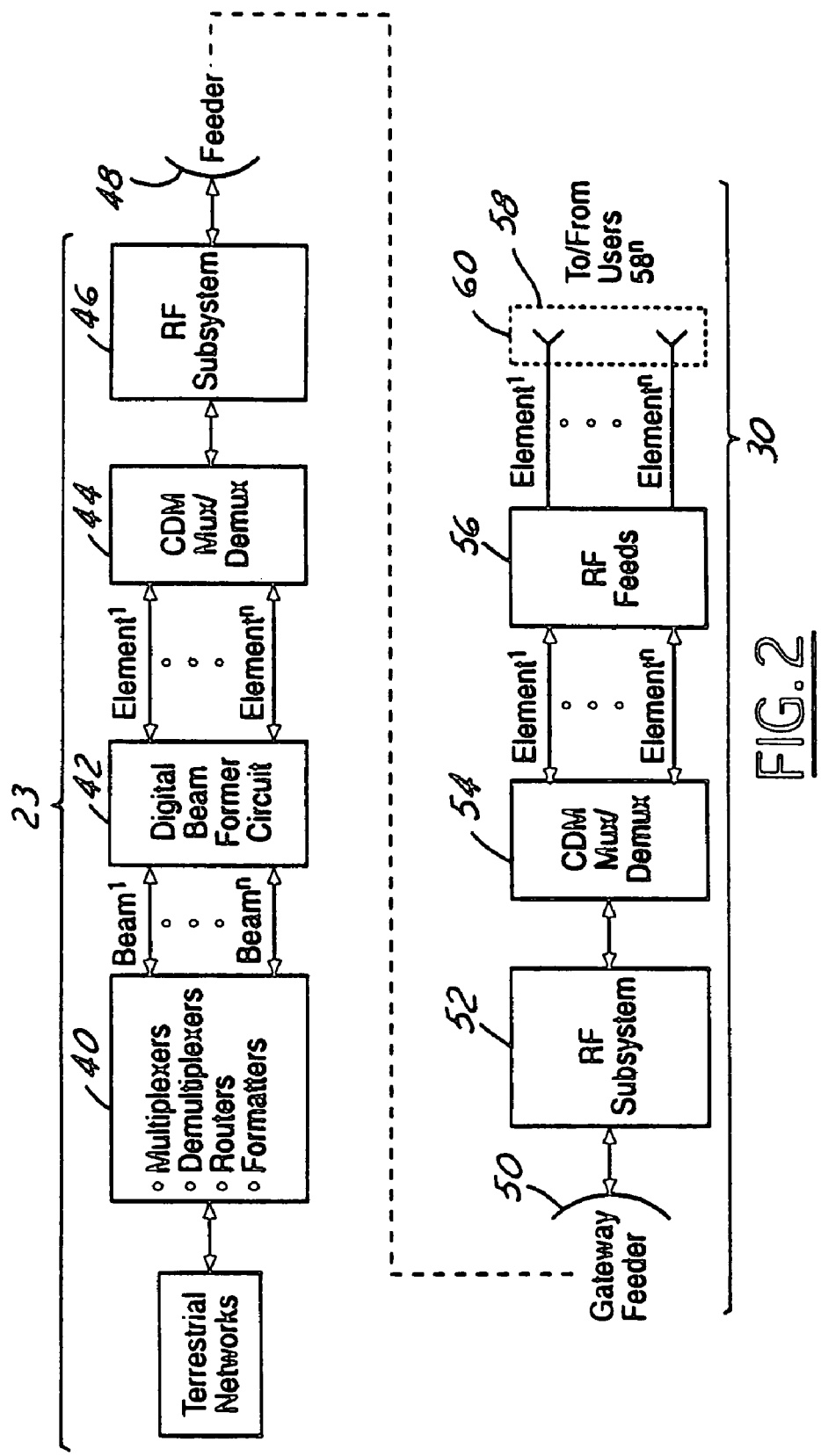
FIG. 2 is a high-level block diagrammatic view of the gateway station and payload platform having a digital beam forming circuit according to the present invention.

Referring now to FIG. 2, a block diagrammatic view of a portion of ground processing facility 23 and payload 30 are illustrated. Ground processing facility 23 has an interface electronics 40 that may represent a plurality of different circuits. For example, beam generator 40 may comprise multiplexers, demultiplexers, routers and formatters. The interface electronics 40 may receive signals from the terrestrial networks 22 or may route various signals from different downlink beams from the platform 18 to the corresponding uplink bins. The "content" of all the uplink beams is placed into these buffers in the interface electronics 40. As illustrated, the signals of beam$^1$ through beam$^n$ represent the buffered "content" that generated by interface electronics 40 and will be sent next to digital beam former circuit 42. The buffered signals are coupled to digital beam former circuit 42. Digital beam former circuit 42 generates element control signals that are ultimately used to control the phase array elements of the platform 18. Digital beam former circuit 42 "scales" all user signals by (1) dividing each user signal into number of paths, each corresponding to one element, (2) multiplying each user signal component according to the signal direction by amplitude and phase weighting, and (3) adding various user components together element by element, and (4) putting the component sum to corresponding element bins. As a result, the user direction information have been embedded in the way the overall signal set is organized, not by separated direction control signals. As will be further described below in FIG. 3, digital beam former circuit 42 may remove interference from other beams based on the gateway station knowing the characteristics of the signals including location and type.

The digital beam former circuit 42 forms a plurality of element signals of element$^1$ through element$^n$. The element signals are coupled to code division multiplexers/demultiplexer 44. The bundled element control signals are then provided to an RF subsystem 46 that is used to transmit the aggregated signals through feeder antenna 48 to the high altitude communication platform 18. The platform 18 has an antenna 50 used to receive the aggregated element-signals from the gateway station 20. The feeder link antenna 50 is coupled to an RF subsystem 52 that processes the received signals in a conventional manner, including amplification, filtering and frequency down conversion. The RF subsystem 52 is coupled to code division multiplexer/demultiplexer 54 that separates the aggregated signals to individual element signals; the signals of element$^1$ to that of element$^n$. The demultiplexer 54 has regenerated all the element signals developed by digital beam former circuit 42 on ground as discussed above. The regenerated element signals are sent to RF feeds 56, that provide the signals to the radiating aperture 58 of the phased array antenna 60. There are no phase shifters in the array. The element phasings for each beam are implemented in the digital beam former on ground and are embedded in the signal overall structure. All user signals will be transmitted simultaneously through the aperture. Thus, a user (user A) signal radiated from various elements will ultimately be added coherently in the designated direction (say, direction A) in far field, while other user signals designated for other directions will be added randomly in direction A. Similarly, in the far field along direction B, signals designated for other users at the same frequency band but designated for different directions will be added non-coherently.

Those skilled in the art would recognize that the ground processing facility 23 and payload 30 are also used for receiving signals from the users. Such systems operate in a reverse manner from that described above and therefore is not repeated.

Figure 3:
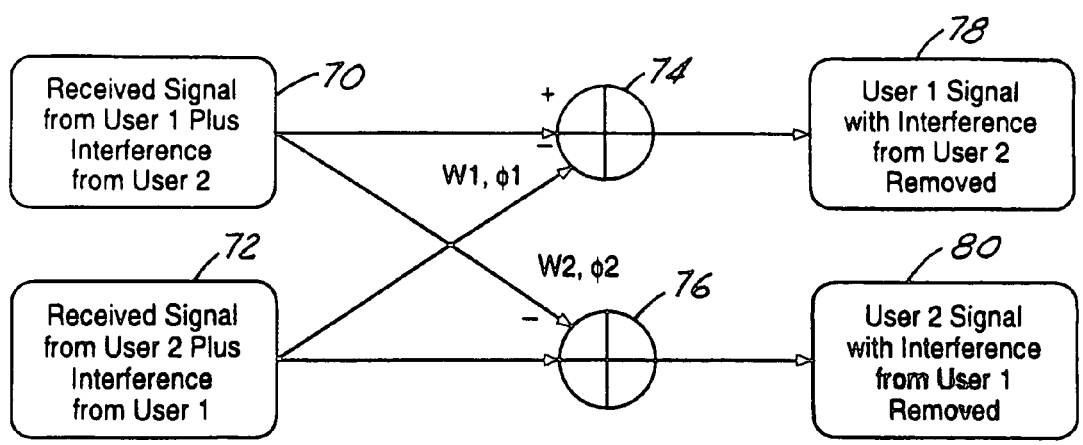
FIG. 3 is a high-level block diagrammatic view of a portion of a gateway station according to the present invention.

Referring now to FIG. 3, the digital beam former circuit 42 is also used to receive signals from the stratospheric platform 18. The digital beam former receives a signal from the first user plus interference from a second user as represented by box 70. The gateway station also receives a second signal from the user that includes interference from the first user. That is, the first beam and the second beam from the first user and the second user include cross interference. A first subtracting block 74 and a second subtracting block 76 are used to eliminate interference in the respective signals. That is, subtracting block 74 receives the second signal from the second user and subtracts it from the first signal having the signal from the first user plus interference from the second user. Preferably, the second signal is weighted prior to subtracting. These weights are illustrated by W1 and Φ1. The output of the subtraction block 74 is block 78 from which the first user signal or first beam without the interference from user 2 is present.

Subtraction block 76 receives the first signal and subtracts the first signal from the second signal to obtain the second user signal with the interference from the first user signal removed therefrom in block 80. Prior to subtraction, the first signal may be weighted prior to subtraction as represented by W2, and Φ2.

The weights W1 and W2 are set to correspond to the amount of interference from the other signal. Because the signals are all received at the gateway station, the amount of interference that can be determined from the relative positions of the beams from the user position files within the gateway station. That is, based on the position of the beams, interference levels may be determined. Therefore, the weights may be ascertained so that the interference cancellation from the other signals may be achieved.

In the prior example, only two signals with cross interference are illustrated. However, the present invention may provide subtraction for various numbers of signals used throughout a communications systems.

While the best modes for carrying out the invention have been described in detail, those familiar with the art to which this invention relates will recognize various alternative designs and embodiments for practicing the invention as defined by the following claims.

What is claimed is:

1. A communications system comprising:
a stratospheric platform having a payload controller and a phased array antenna having a plurality of elements for generating a first beam and a second beam; and
a gateway station in communication with said stratospheric platform, said gateway station receiving a first signal having the first beam having interference from the second beam therein and receiving a second signal having the second beam having interference from the first beam therein,
said gateway station comprising a first subtracting block for subtracting said second signal from said first signal to obtain the first beam; and
said gateway station comprising a second subtracting block for subtracting said first signal from said second signal to obtain the second beam.

2. A communications system as recited in claim 1, wherein said gateway station weights said second signal with a first weight prior to subtracting said second signal from said first signal.

3. A communications system as recited in claim 1, wherein said gateway station weights said first signal with a second weight prior to subtracting said second signal from said first signal.

4. A communications system as recited in claim 1, wherein said first weight is a function of user position files.

5. A communications system as recited in claim 1, wherein the payload controller comprises a demultiplexer for receiving control signals.

6. A communications system as recited in claim 5, wherein the demultiplexer generates a plurality of element control signals.

7. A communications system as recited in claim 6, wherein the element control signals are coupled to an RF feed, and the RF feed is coupled to said plurality of elements of said phased array antenna.

8. A communications system as recited in claim 1, wherein the gateway station comprises a beam generator for generating beam signals.

9. A communications system as recited in claim 1, wherein said gateway station further comprises a multiplexer/demultiplexer.

10. A communications system as recited in claim 9, wherein said multiplexer/demultiplexer comprises a code division multiplexer/demultiplexer.

11. A communications system as recited in claim 1, wherein said gateway station is coupled to a terrestrial network.

12. A system as recited in claim 11, wherein said terrestrial network comprises an Internet.

13. A system as recited in claim 11, wherein the terrestrial network comprises a public service telephone network.

14. A communications system comprising:
a stratospheric platform having a payload controller and an antenna having a plurality of elements for generating a first beam and a second beam; and
a gateway station in communication with said stratospheric platform, said gateway station receiving a first signal having the first beam having interference from the second beam therein and receiving a second signal having the second beam having interference from the first beam therein, said gateway station weighing said second signal with a first weight to form a weighted second signal, and thereafter, said gateway station comprising a first subtracting block subtracting said second weighted signal from said first signal to obtain the first beam, wherein said first weight is a function of user position files; and said gateway station comprising a second subtracting block for subtracting said first signal from said second signal to obtain the second beam.

15. A communications system comprising:

a stratospheric platform having a payload controller and an antenna having a plurality of elements for generating a first beam and a second beam; and a gateway station in communication with said stratospheric platform, said gateway station receiving a first signal having the first beam having interference from the second beam therein and receiving a second signal having the second beam having interference from the first beam therein, said gateway station weighing said second signal with a first weight to form a weighted second signal, and thereafter, said gateway station comprising a first subtracting block subtracting said second weighted signal from said first signal to obtain the first beam; and said gateway station weighing said first signal with a second weight to from a first weighted signal, said gateway station comprising a second subtracting block for subtracting said first weighted signal from said second signal to obtain the second beam, said first weight and the second weight being a function of user position files.

* * * * *